United States Patent
Levanen et al.

(10) Patent No.: US 11,888,664 B2
(45) Date of Patent: Jan. 30, 2024

(54) SYMBOL-SYNCHRONOUS CONTINUOUS FAST-CONVOLUTION-BASED PROCESSING

(71) Applicant: Nokia Solutions and Networks Oy, Espoo (FI)

(72) Inventors: Toni Levanen, Tampere (FI); Juha Yli-Kaakinen, Tampere (FI)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 18/251,490

(22) PCT Filed: Oct. 20, 2021

(86) PCT No.: PCT/FI2021/050700
§ 371 (c)(1),
(2) Date: May 2, 2023

(87) PCT Pub. No.: WO2022/096778
PCT Pub. Date: May 12, 2022

(65) Prior Publication Data
US 2023/0344691 A1 Oct. 26, 2023

(30) Foreign Application Priority Data

Nov. 5, 2020 (FI) .................................... 20206110

(51) Int. Cl.
*H04L 27/26* (2006.01)
(52) U.S. Cl.
CPC .. *H04L 27/26025* (2021.01); *H04L 27/26412* (2021.01)
(58) Field of Classification Search
CPC . H04B 17/309; H04B 7/0413; H04L 27/2607; H04L 27/2605; H04L 27/04
See application file for complete search history.

(56) References Cited

U.S. PATENT DOCUMENTS

| 6,266,687 B1 | 7/2001 | Leyonhjelm et al. |
| 7,206,350 B2 | 4/2007 | Korobkov et al. |

(Continued)

FOREIGN PATENT DOCUMENTS

| EP | 3537679 A1 | 9/2019 |
| WO | 2017/167386 A1 | 10/2017 |

OTHER PUBLICATIONS

Yli-Kaakinen et al., "Flexible fast-convolution implementation of single-carrier waveform processing for 5G", IEEE International Conference on Communication Workshop (ICCW), Jun. 8-12, 2015, pp. 1269-1274.

(Continued)

*Primary Examiner* — Khanh C Tran
(74) *Attorney, Agent, or Firm* — Nokia Solutions and Networks Oy

(57) ABSTRACT

According to an aspect, there is provided an apparatus comprising for performing the following. The apparatus receives a stream of orthogonal frequency division multiplexing symbols and associated cyclic prefixes produced by at least one orthogonal frequency-division multiplexing modulator of a radio transmitter or transceiver. The apparatus divides said stream into a plurality of overlapping processing blocks of a first length. At least one of the plurality of overlapping processing blocks comprises a non-overlapping section having values corresponding to a segment of said stream. The dividing comprises adjusting a length of the non-overlapping section at least based on whether a cyclic prefix is comprised in said segment and, if this is true, on a length of said cyclic prefix. The apparatus filters the plurality of overlapping processing blocks using fast convolution processing and concatenates filtered processing blocks to form an output signal for transmission using the radio transmitter or transceiver.

18 Claims, 10 Drawing Sheets

(56) References Cited

U.S. PATENT DOCUMENTS

| | | | |
|---|---|---|---|
| 10,778,476 | B2 | 9/2020 | Renfors et al. |
| 2006/0159189 | A1 | 7/2006 | Balakrishnan et al. |
| 2012/0115485 | A1* | 5/2012 | Narasimha ............ H04W 68/02 |
| | | | 455/437 |
| 2017/0257238 | A1 | 9/2017 | Qian et al. |
| 2019/0280818 | A1* | 9/2019 | Renfors ................ H04L 5/0007 |
| 2020/0007361 | A1* | 1/2020 | Renfors ................ H04L 5/0098 |

OTHER PUBLICATIONS

Renfors et al., "Efficient fast-convolution implementation of filtered CP-OFDM waveform processing for 5G", IEEE Globecom Workshops (GC Wkshps), Dec. 6-10, 2015, 7 pages.

Yli-Kaakinen et al., "Optimized fast convolution based filtered-OFDM processing for 5G", European Conference on Networks and Communications (EuCNC), Jun. 12-15, 2017, 6 pages.

Yli-Kaakinen et al., "Optimized Reconfigurable Fast Convolution-Based Transmultiplexers for Flexible Radio Access", IEEE Transactions on Circuits and Systems II: Express Briefs, vol. 65, No. 1, Jan. 2018, pp. 130-134.

Yli-Kaakinen et al., "Efficient Fast-Convolution-Based Waveform Processing for 5G Physical Layer", IEEE Journal on Selected Areas in Communications, vol. 35, No. 6, Jun. 2017, pp. 1309-1326.

Yli-Kaakinen et al., "Frequency-domain signal processing for spectrally-enhanced CP-OFDM waveforms in 5G new radio", IEEE Transactions on Wireless Communications, Aug. 3, 2020.

Yli-Kaakinen et al., "Generalized fast-convolution-based filtered-OFDM: Techniques and application to 5G new radio", IEEE Transactions on Signal Processing, vol. 68, Feb. 6, 2020, pp. 1213-1228.

Yli-Kaakinen et al., "FFT-Domain Signal Processing for Spectrally-Enhanced CP-OFDM Waveforms in 5G New Radio", 52nd Asilomar Conference on Signals, Systems, and Computers, Oct. 28-31, 2018, pp. 1049-1056.

Loulou, "Low-complexity Multicarrier Waveform Processing Schemes for Future Wireless Communications", Dissertations, Nov. 22, 2019, 125 pages.

"Initial downlink performance results for the New Radio waveforms below 6 GHz", 3GPP TSG-RAN WG1 #85, R1-165401, Agenda: 7.1.3.1, Nokia, May 23-27, 2016, 6 pages.

Demmer, "OFDM Precoding for Filter-bank Based Waveforms", Thesis, Jun. 6, 2019, 172 pages.

Office action received for corresponding Finnish Patent Application No. 20206110, dated Jun. 23, 2021, 9 pages.

International Search Report and Written Opinion received for corresponding Patent Cooperation Treaty Application No. PCT/FI2021/050700, dated Jan. 20, 2022, 13 pages.

Boucheret et al., "Fast convolution filter banks for satellite payloads with on-board processing", IEEE Journal on Selected Areas in Communications, vol. 17, No. 2, Feb. 1999, pp. 238-248.

Office action received for corresponding Finnish Patent Application No. 20206110, dated Sep. 19, 2022, 3 pages.

International Preliminary Examining Authority received for corresponding Patent Cooperation Treaty Application No. PCT/FI2021/050700, dated Nov. 30, 2022, 7 pages.

International Preliminary Report on Patentability Chapter II received for corresponding Patent Cooperation Treaty Application No. PCT/FI2021/050700, dated Feb. 7, 2023, 8 pages.

\* cited by examiner

| 15 kHz SYMBOLs + CPs | 30 kHz SYMBOLs + CPs | 60 kHz SYMBOLs + CPs | FC Blocks | |
|---|---|---|---|---|
| 1. 1024+80 samples | 1. 512+44 samples | 1. 256+26 samples | 1. $\overline{L_s}$ = 556 | |
| | | 2. 256+18 samples | | 2. $L_s$ = 548 |
| | 2. 512+36 samples | 3. 256+18 samples | | |
| | | 4. 256+18 samples | | |
| 2. 1024+72 samples | 3. 512+36 samples | 5. 256+18 samples | 3. $L_s$ = 548 | |
| | | 6. 256+18 samples | | |
| | 4. 512+36 samples | 7. 256+18 samples | | 4. $L_s$ = 548 |
| | | 8. 256+18 samples | | |
| 3. 1024+72 samples | 5. 512+36 samples | 9. 256+18 samples | 5. $L_s$ = 548 | |
| | | 10. 256+18 samples | | |
| | 6. 512+36 samples | 11. 256+18 samples | | 6. $L_s$ = 548 |
| | | 12. 256+18 samples | | |
| 4. 1024+72 samples | 7. 512+36 samples | 13. 256+18 samples | 7. $L_s$ = 548 | |
| | | 14. 256+18 samples | | |
| | 8. 512+36 samples | 15. 256+18 samples | | 8. $L_s$ = 548 |
| | | 16. 256+18 samples | | |
| 5. 1024+72 samples | 9. 512+36 samples | 17. 256+18 samples | 9. $L_s$ = 548 | |
| | | 18. 256+18 samples | | |
| | 10. 512+36 samples | 19. 256+18 samples | | 10. $L_s$ = 548 |
| | | 20. 256+18 samples | | |
| 6. 1024+72 samples | 11. 512+36 samples | 21. 256+18 samples | 11. $L_s$ = 548 | |
| | | 22. 256+18 samples | | |
| | 12. 512+36 samples | 23. 256+18 samples | | 12. $L_s$ = 548 |
| | | 24. 256+18 samples | | |
| 7. 1024+72 samples | 13. 512+36 samples | 25. 256+18 samples | 13. $L_s$ = 548 | |
| | | 26. 256+18 samples | | |
| | 14. 512+36 samples | 27. 256+18 samples | | 14. $L_s$ = 548 |
| | | 28. 256+18 samples | | |
| | 15. 512+44 samples | 29. 256+26 samples | 15. $\overline{L_s}$ = 556 | |
| 8. 1024+80 samples | | 30. 256+18 samples | | |
| | 16. 512+36 samples | 31. 256+18 samples | | 16. $L_s$ = 548 |
| | | 32. 256+18 samples | | |
| Zeros | Zeros | Zeros | | |

Fig. 8A

| 15 kHz SYMBOLs + CPs | 30 kHz SYMBOLs + CPs | 60 kHz SYMBOLs + CPs | FC Blocks | |
|---|---|---|---|---|
| 1024+80 samples | 512+44 samples | 256+26 samples | 1. $\bar{\bar{L}}_s = 282$ | |
| | | 256+18 samples | | 2. $L_s = 274$ |
| | 512+36 samples | 256+18 samples | 3. $L_s = 274$ | |
| | | 256+18 samples | | 4. $L_s = 274$ |
| 1024+72 samples | 512+36 samples | 256+18 samples | 5. $L_s = 274$ | |
| | | 256+18 samples | | 6. $L_s = 274$ |
| | 512+36 samples | 256+18 samples | 7. $L_s = 274$ | |
| | | 256+18 samples | | 8. $L_s = 274$ |
| 1024+72 samples | 512+36 samples | 256+18 samples | 9. $L_s = 274$ | |
| | | 256+18 samples | | 10. $L_s = 274$ |
| | 512+36 samples | 256+18 samples | 11. $L_s = 274$ | |
| | | 256+18 samples | | 12. $L_s = 274$ |
| 1024+72 samples | 512+36 samples | 256+18 samples | 13. $L_s = 274$ | |
| | | 256+18 samples | | 14. $L_s = 274$ |
| | 512+36 samples | 256+18 samples | 15. $L_s = 274$ | |
| | | 256+18 samples | | 16. $L_s = 274$ |
| 1024+72 samples | 512+36 samples | 256+18 samples | 17. $L_s = 274$ | |
| | | 256+18 samples | | 18. $L_s = 274$ |
| | 512+36 samples | 256+18 samples | 19. $L_s = 274$ | |
| | | 256+18 samples | | 20. $L_s = 274$ |
| 1024+72 samples | 512+36 samples | 256+18 samples | 21. $L_s = 274$ | |
| | | 256+18 samples | | 22. $L_s = 274$ |
| | 512+36 samples | 256+18 samples | 23. $L_s = 274$ | |
| | | 256+18 samples | | 24. $L_s = 274$ |
| 1024+72 samples | 512+36 samples | 256+18 samples | 25. $L_s = 274$ | |
| | | 256+18 samples | | 26. $L_s = 274$ |
| | 512+36 samples | 256+18 samples | 27. $L_s = 274$ | |
| | | 256+18 samples | | 28. $L_s = 274$ |
| 1024+80 samples | 512+44 samples | 256+26 samples | 29. $\bar{\bar{L}}_s = 282$ | |
| | | 256+18 samples | | 30. $L_s = 274$ |
| | 512+36 samples | 256+18 samples | 31. $L_s = 274$ | |
| | | 256+18 samples | | 32. $L_s = 274$ |
| Zeros | Zeros | Zeros | | |

Fig. 8B

| 15 kHz SYMBOLs + CPs | 30 kHz SYMBOLs + CPs | 60 kHz SYMBOLs + CPs | FC Blocks | |
|---|---|---|---|---|
| 1024+80 samples | 512+44 samples | 256+26 samples | 1. Ls = 145 | 2. Ls = 137 |
| | | 256+18 samples | 3. Ls = 137 | 4. Ls = 137 |
| | 512+36 samples | 256+18 samples | 5. Ls = 137 | 6. Ls = 137 |
| | | 256+18 samples | 7. Ls = 137 | 8. Ls = 137 |
| 1024+72 samples | 512+36 samples | 256+18 samples | 9. Ls = 137 | 10. Ls = 137 |
| | | 256+18 samples | 11. Ls = 137 | 12. Ls = 137 |
| | 512+36 samples | 256+18 samples | 13. Ls = 137 | 14. Ls = 137 |
| | | 256+18 samples | 15. Ls = 137 | 16. Ls = 137 |
| 1024+72 samples | 512+36 samples | 256+18 samples | 17. Ls = 137 | 18. Ls = 137 |
| | | 256+18 samples | 19. Ls = 137 | 20. Ls = 137 |
| | 512+36 samples | 256+18 samples | 21. Ls = 137 | 22. Ls = 137 |
| | | 256+18 samples | 23. Ls = 137 | 24. Ls = 137 |
| 1024+72 samples | 512+36 samples | 256+18 samples | 25. Ls = 137 | 26. Ls = 137 |
| | | 256+18 samples | 27. Ls = 137 | 28. Ls = 137 |
| | 512+36 samples | 256+18 samples | 29. Ls = 137 | 30. Ls = 137 |
| | | 256+18 samples | 31. Ls = 137 | 32. Ls = 137 |
| 1024+72 samples | 512+36 samples | 256+18 samples | 33. Ls = 137 | 34. Ls = 137 |
| | | 256+18 samples | 35. Ls = 137 | 36. Ls = 137 |
| | 512+36 samples | 256+18 samples | 37. Ls = 137 | 38. Ls = 137 |
| | | 256+18 samples | 39. Ls = 137 | 40. Ls = 137 |
| 1024+72 samples | 512+36 samples | 256+18 samples | 41. Ls = 137 | 42. Ls = 137 |
| | | 256+18 samples | 43. Ls = 137 | 44. Ls = 137 |
| | 512+36 samples | 256+18 samples | 45. Ls = 137 | 46. Ls = 137 |
| | | 256+18 samples | 47. Ls = 137 | 48. Ls = 137 |
| 1024+72 samples | 512+36 samples | 256+18 samples | 49. Ls = 137 | 50. Ls = 137 |
| | | 256+18 samples | 51. Ls = 137 | 52. Ls = 137 |
| | 512+36 samples | 256+18 samples | 53. Ls = 137 | 54. Ls = 137 |
| | | 256+18 samples | 55. Ls = 137 | 56. Ls = 137 |
| 1024+80 samples | 512+44 samples | 256+26 samples | 57. Ls = 145 | 58. Ls = 137 |
| | | 256+18 samples | 59. Ls = 137 | 60. Ls = 137 |
| | 512+36 samples | 256+18 samples | 61. Ls = 137 | 62. Ls = 137 |
| | | 256+18 samples | 63. Ls = 137 | 64. Ls = 137 |
| Zeros | Zeros | Zeros | | |

Fig. 8C

SYMBOL-SYNCHRONOUS CONTINUOUS FAST-CONVOLUTION-BASED PROCESSING

RELATED APPLICATION

This application claims priority to PCT Application No. PCT/FI2021/050700, filed on Oct. 20, 2021, which claims priority to FI Application No. 20206110 filed on Nov. 5, 2020, each of which is incorporated herein by reference in its entirety.

TECHNICAL FIELD

Various example embodiments relate to wireless communications.

BACKGROUND ART

The fifth generation (5G) cellular systems aim to improve the throughput by a huge factor (even up to 1000 or more), which presents a multitude of challenges, especially considering the scarcity of spectrum at low frequency bands and the need for supporting a very diverse set of use cases. In order to reach this goal, it is important to exploit the higher frequencies such as millimeter wave frequencies in addition to the more conventional lower frequencies. To meet the demands of 5G systems, a new, globally standardized radio access technology known as New Radio (NR) has been proposed. Due to diverse service requirements imposed by NR, a high level of spectral containment in the transmitter and the receiver is required to isolate transmissions with different numerology (so called mixed numerology scenarios) or asynchronous traffic. This, in turn, necessitates new types of waveform processing solutions for achieving sufficiently high performance.

BRIEF DESCRIPTION

According to an aspect, there is provided the subject matter of the independent claims. Embodiments are defined in the dependent claims.

One or more examples of implementations are set forth in more de-tail in the accompanying drawings and the description below. Other features will be apparent from the description and drawings, and from the claims.

Some embodiments provide an apparatus, a method, and computer readable media for symbol-synchronous continuous fast-convolution-based processing.

BRIEF DESCRIPTION OF THE DRAWINGS

In the following, some example embodiments will be described with reference to the accompanying drawings, in which

FIGS. 8A, 8B and 8C illustrate exemplary OFDM symbol and prefix streams and processing blocks according to embodiments.

DETAILED DESCRIPTION OF SOME EMBODIMENTS

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments.

In the following, different exemplifying embodiments will be described using, as an example of an access architecture to which the embodiments may be applied, a radio access architecture based on long term evolution advanced (LTE Advanced, LTE-A) or new radio (NR, 5G), without restricting the embodiments to such an architecture, however. It is obvious for a person skilled in the art that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 1:
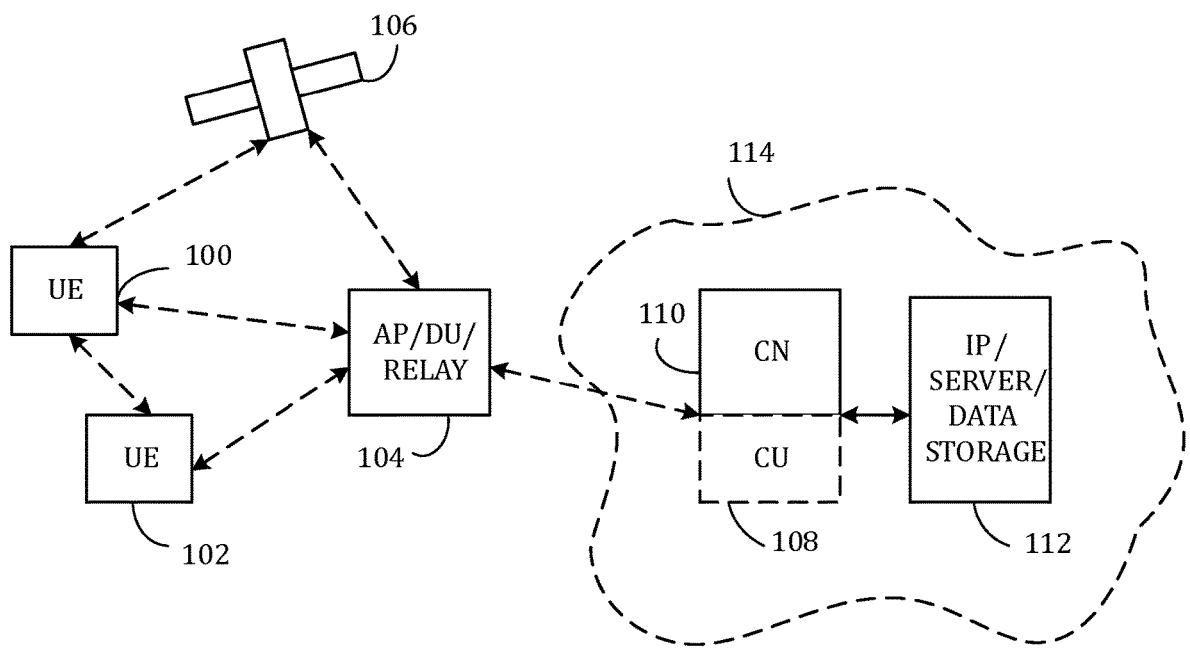
FIG. 1 illustrates an example of a communications system to which embodiments may be applied.

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1.

The embodiments are not, however, restricted to the system given as an example but a person skilled in the art may apply the solution to other communication systems provided with necessary properties.

The example of FIG. 1 shows a part of an exemplifying radio access network.

FIG. 1 shows user devices 100 and 102 configured to be in a wireless connection on one or more communication channels in a cell with an access node (such as (e/g)NodeB) 104 providing the cell. The physical link from a user device to a (e/g)NodeB is called uplink or reverse link and the physical link from the (e/g)NodeB to the user device is called downlink or forward link. It should be appreciated that (e/g)NodeBs or their functionalities may be implemented by using any node, host, server or access point etc. entity suitable for such a usage.

A communications system typically comprises more than one (e/g)NodeB in which case the (e/g)NodeBs may also be configured to communicate with one another over links, wired or wireless, designed for the purpose. These links may be used for signaling purposes. The (e/g)NodeB is a computing device configured to control the radio resources of communication system it is coupled to. The NodeB may also be referred to as a base station, an access point, an access node or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to user devices. The antenna unit may comprise a plurality of antennas or antenna elements. The (e/g)NodeB is further connected to core network 110 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), etc.

The user device (also called UE, user equipment, user terminal, terminal device, etc.) illustrates one type of an apparatus to which resources on the air interface are allocated and assigned, and thus any feature described herein with a user device may be implemented with a corresponding apparatus, such as a relay node. An example of such a relay node is a layer 3 relay (self-backhauling relay) towards the base station.

The user device typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example is a camera or video camera loading images or video clips to a network. A user device may also be a device having capability to operate in Internet of Things (IoT) network which is a scenario in which objects are provided with the ability to transfer data over a network without requiring human-to-human or human-to-computer interaction. The user device may also utilize cloud. In some applications, a user device may comprise a small portable device with radio parts (such as a watch, earphones or eyeglasses) and the computation is carried out in the cloud. The user device (or in some embodiments a layer 3 relay node) is configured to perform one or more of user equipment functionalities. The user device may also be called a subscriber unit, mobile station, remote terminal, access terminal, user terminal or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT (information and communications technology) devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, namely below 6 GHz, cmWave and mmWave, and also being integradable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz—cmWave, below 6 GHz—cmWave—mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablet computers and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 112, or utilize services provided by them. The communication system may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NVF) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 104) and non-real time functions being carried out in a centralized manner (in a centralized unit, CU 108).

It should also be understood that the distribution of labor between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway/maritime/aeronautical communications. Satellite communication may utilize geostationary earth orbit (GEO) satellite systems, but also low earth orbit (LEO) satellite systems, in particular mega-constellations (systems in which hundreds of (nano)satellites are deployed). Each satellite 106 in the mega-constellation may cover several satellite-enabled network entities that create on-ground cells. The on-ground cells may be created through an on-ground relay node 104 or by a gNB located on-ground or in a satellite.

It is obvious for a person skilled in the art that the depicted system is only an example of a part of a radio access system and in practice, the system may comprise a plurality of (e/g)NodeBs, the user device may have an access to a plurality of radio cells and the system may comprise also other apparatuses, such as physical layer relay nodes or other network elements, etc. At least one of the (e/g)NodeBs may be a Home (e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g)NodeBs are required to provide such a network structure.

For fulfilling the need for improving the deployment and performance of communication systems, the concept of "plug-and-play" (e/g)NodeBs has been introduced. Typically, a network which is able to use "plug-and-play" (e/g)Node Bs, includes, in addition to Home (e/g)NodeBs (H(e/g)nodeBs), a home node B gateway, or HNB-GW (not shown in FIG. 1). A HNB Gateway (HNB-GW), which is typically installed within an operator's network may aggregate traffic from a large number of HNBs back to a core network.

One key element necessary for achieving high throughput broadband communications envisioned for 5G communication systems like the one shown in FIG. 1 is orthogonal frequency-division multiplexing (OFDM). According to a broad definition, OFDM is a method of encoding digital data on multiple carrier (or subcarrier) frequencies. More specifically, multiple closely spaced orthogonal subcarrier signals with overlapping spectra are used for carrying data.

While OFDM is already used in 4G communications systems, the more stringent requirements for the 5G communications systems necessitate improvements to the established methods.

Figure 2:
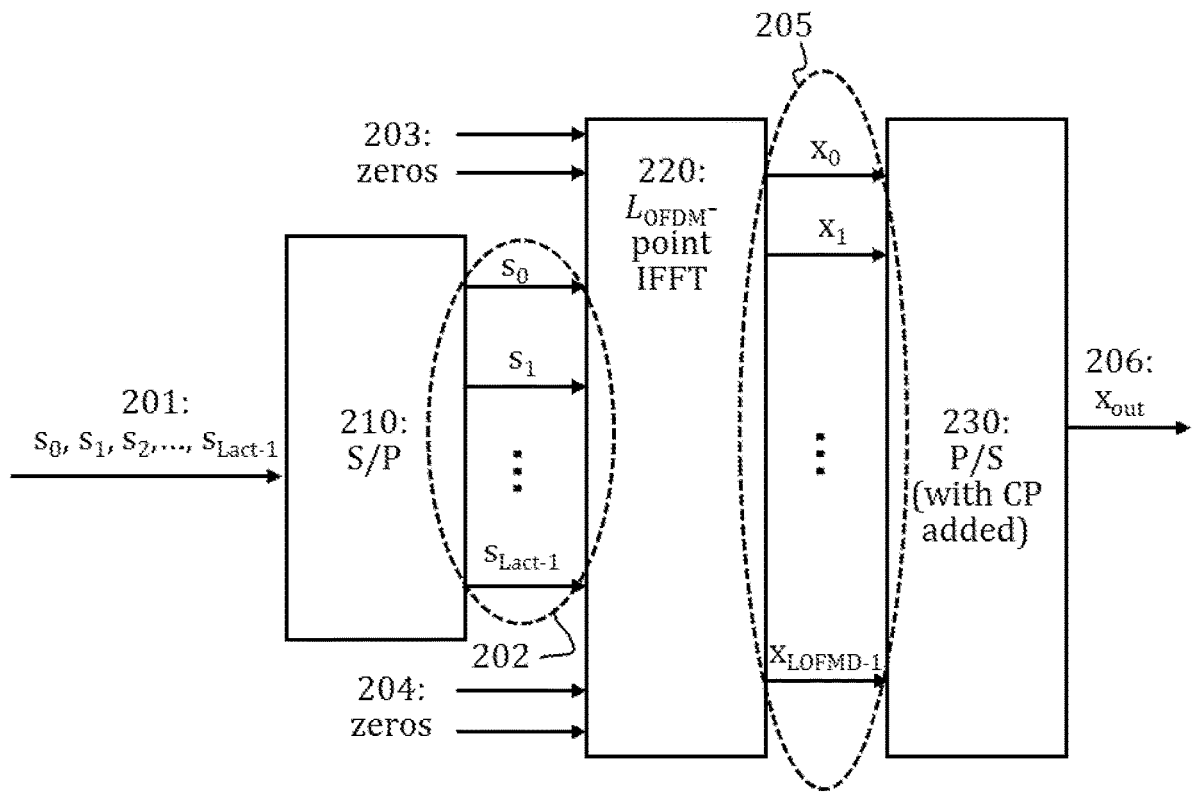
FIG. 2 illustrates fast Fourier transform based orthogonal frequency division multiplexing signal generation according to prior art.

To provide background for the embodiments to be discussed later, a conventional OFDM scheme is briefly discussed in relation to FIG. 2. FIG. 2 illustrates a generic system for generating an OFDM signal in a transmitter using inverse fast Fourier transform (IFFT).

Referring to FIG. 2, $L_{act}$ data symbols $s_0, s_1, s_2, \ldots, s_{L_{cat}-1}$ 201 in series format are provided for transmission by a radio transmitter. Each data symbol 201 corresponds to a complex number according to a modulation scheme, e.g., QPSK (quadrature phase shift keying) or 16-QAM (16 quadrature amplitude modulation). From the point of view of the IFFT processing, each data symbol 201 in the series corresponds to a certain carrier frequency. Said data symbols 201 in series are provided as an input for a serial to parallel converter 210. The serial to parallel converter separates the data symbols 201 to $L_{act}$ parallel data streams 202. In the example of FIG. 2, the number of data symbols $L_{act}$ is not equal to the number of inputs $L_{OFDM}$ of the IFFT processing block 220 (i.e., the length of the IFFT). Thus, the input of the IFFT processing block 220 is padded with zeros 203, 204. The IFFT processing block 220 modulates the input data symbols 202, 203, 204 (corresponding to values assigned to frequency bins) and provides $L_{OFDM}$ parallel output signals $x_0, x_1, x_2, \ldots, x_{L_{OFDM}-1}$ 205 (time-domain signals). Due to the intrinsic properties of the IFFT (or Fourier transform in general), the generated carrier signals are always orthogonal. The parallel output signals 205 are provided as an input to a parallel to serial converter 230 which forms an output signal $x_{out}$ comprising one OFDM symbol of $L_{OFDM}$ samples. The output signal may be further fed to a digital-to-analog converter and subsequently to an antenna of the corresponding radio transmitter. The main benefits of the OFDM are the high flexibility and efficiency in allocating the spectral resources to different users, simple and robust way of channel equalization as well as simplicity of combining the multiantenna schemes with core physical layer processing. OFDM or specifically FFT-based OFDM further enables to defining the signal in the frequency domain (in software) and to generate the signal using the computationally efficient, low complexity IFFT. A reverse process to the one illustrated in FIG. 2 needs to be carried out in the receiver receiving the OFDM signal.

In order to prevent the deterioration of the performance of the radio link due to multipath delay spread (that is, due to different multipath components of the transmitted signal arriving at the receiver at different times), a so-called cyclic prefix (CP) may be introduced to each OFDM symbol. This functionality may be performed by element 230. The cyclic prefix refers to an extension of a symbol by inserting a copy of $L_{CP}$ last samples of a symbol to the beginning of said symbol. Said process leads to an extended, but still continuous OFDM symbol (or a CP-OFDM symbol). The signal generated by said process is called a CP-OFDM signal. By choosing the cyclic prefix to be longer than the delay spread, the adverse effects of the delay spread (e.g., loss of orthogonality leading to intersymbol interference, ISI) may be avoided. Obviously, since symbol time is increased, the maximum achievable bit rate of transmission is reduced. In the receiver, an inverse process needs to be performed in order to remove the cyclic prefix. In addition to protecting transmitted symbols from intersymbol interference, varying the length of the cyclic prefix (in samples) may also be used for aligning the duration of a pre-set group of CP-OFDM symbols with a desired length. For example, in LTE systems, the length of the cyclic prefix of the first OFDM symbol of a slot is always longer than the cyclic prefix of the following OFDM symbols, when normal cyclic prefix is used, so as to align the duration of the CP-OFDM symbols with a duration of a half subframe (i.e., with 0.5 ms).

While the CP-OFDM signal provides a sufficiently efficient solution for the needs of many current generation systems, it has several disadvantages which need to be overcome in order to meet the higher demands of the proposed future communications system. The CP-OFDM signal has relatively high side lobes in spectrum, which causes power leakage to adjacent channels and necessitates the use of larger guard bands which, in turn, degrades the spectral efficiency. Moreover, use of a power amplifier (PA) may further increase said power leakage.

It should be appreciated that the block diagram shown in FIG. 2 is a simplified presentation of the CP-OFDM scheme. The CP-OFDM scheme may further comprise performing, for example, mapping of the signal bits to complex numbers and/or insertion of pilot sequences (unmodulated data used for synchronization and channel estimation).

Figure 3A:
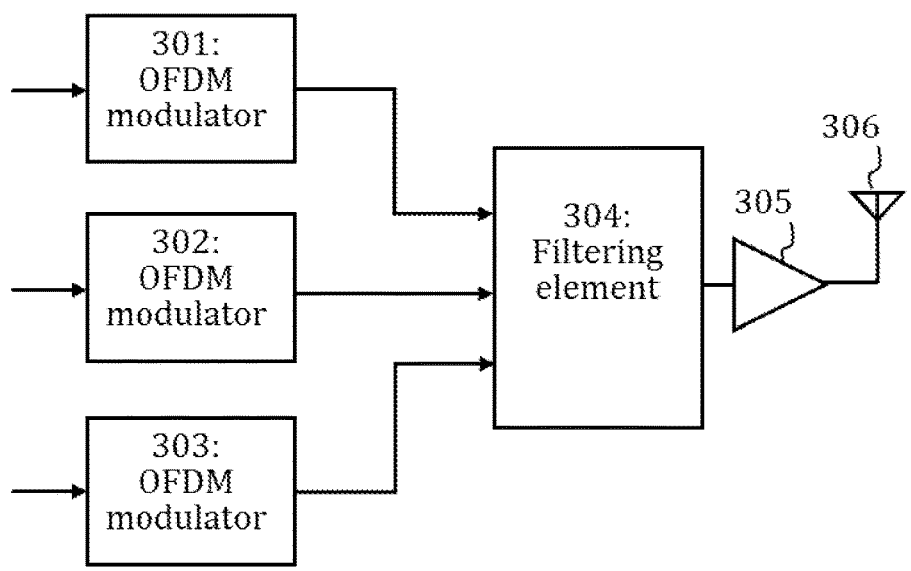
FIGS. 3A and 3B illustrate, respectively, simplified fast Fourier transform based orthogonal frequency division multiplexing transmitter and receiver architectures.
Figure 3B:
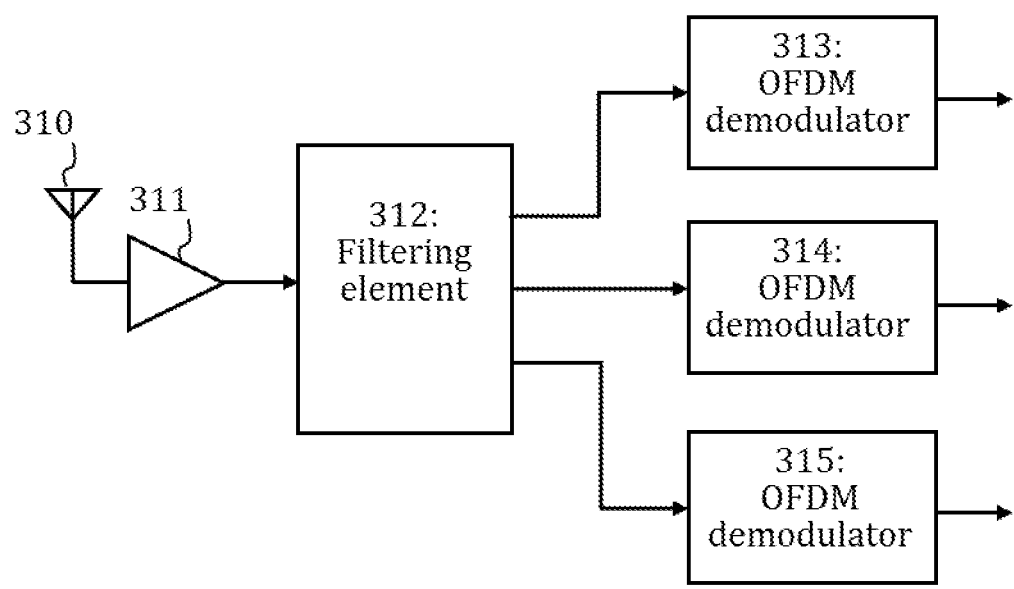

FIGS. 3A and 3B illustrate two solutions for overcoming the aforementioned problems with the CP-OFDM scheme, namely one solution implemented in the transmitter (Tx) and one solution implemented in the receiver-side (Rx). In FIG. 3A, each of the OFDM modulators 301, 302, 303 may comprise at least some of the elements depicted in FIG. 2. Each OFDM modulator 301, 302, 303 may be configured to provide OFDM modulation for a particular subband of the frequency band of interest. In the scheme illustrated in FIG. 3A, the CP-OFDM signals produced by the OFDM modulators 301 to 303 are further filtered using a filtering element 304 (or a filtering engine) to improve spectral containment. In other words, channel filtering is applied on top of the CP-OFDM technique. Such schemes are commonly called filtered CP-OFDM (simply filtered OFDM). Specifically, the filtering element 304 may perform subband-wise filtering of the CP-OFDM signals of the radio channel, that is, first perform the filtering separately for one or more OFDM input signals consisting of one or more subbands to eliminate (or at least mitigate) any unwanted sidelobes, then modulate the filtered subbands to their desired locations, and finally combine the filtered and modulated signals to form a high-rate output signal. After the filtering stage 304, the resulting signal may be coupled via a digital-to-analog converter (not shown in FIG. 3) and an amplifier 305 to an antenna 306 of the transmitter for transmission. The filtering element 304 of FIG. 3A may be called a synthesis filter bank.

A receiver illustrated in FIG. 3B is configured to perform a reverse process compared to the transmitter of FIG. 3A. Namely, a received signal is first amplified by an amplifier 311 and thereafter fed to a filtering element 312 which is configured to filter said received amplifier signal as well as divide it into subband signals. The subband signals are subsequently fed to OFDM demodulators 313, 314, 315 which demodulate the provided OFDM signals, that is, extract the transmitted data symbols from them. While three OFDM demodulators 313, 314, 315 are depicted in FIG. 3B, some receivers may have comprise only one OFDM demodulator (e.g., UE device) and thus be configured to detect only one subband.
The filtering element 312 of FIG. 3B may be called an analysis filter bank.

To improve spectral containment, the filtering element 304 may be specifically configured to use a fast-convolution (FC)-based approach. In FC-based approaches when used at the transmitter side, the filtering is performed by converting each subband CP-OFDM signal to frequency domain using fast Fourier transform (FFT) (or other orthogonal transform), applying a frequency-domain window to each frequency-domain subband of the CP-OFDM signal (i.e., multiplying each signal point-wise with the frequency-domain window) and converting said signals back to time-domain using IFFT (or other orthogonal inverse transform). FC-based approach effectively implements a time-domain convolution between the input signal and the frequency-domain window converted to time domain based on convolution theorem. A reverse FC-based process may be implemented in the filtering element 312 of FIG. 3B of the receiver for improving spectral containment.

The FC-based filtered OFDM (FC-F-OFDM) schemes typically apply filtering in continuous manner over a frame of CP-OFDM (or zero-prefix-OFDM) symbols. In continuous FC Tx processing implemented, e.g., in the filtering element 304, a continuous stream of CP-OFDM symbols is divided into overlapping FC processing blocks (i.e., signal blocks or segments) of the same size, where the overlap between adjacent FC blocks is fixed (typically 50%). Since the CP length often (e.g., in 5G NR) is non-zero (and the FC processing block length is typically a power-of-two value), FC processing blocks are typically not time-synchronized to CP-OFDM symbols when continuous FC Tx processing is employed. Data of each FC processing block is cyclically convoluted with finite-length impulse response and the resulting output segments are concatenated by saving the non-overlapping parts.

One disadvantage of the continuous FC Tx processing scheme is that when the numerology, bandwidth or the center frequency of the BWP changes in the middle of the FC processing block, the filtering performance degrades due to fact that the filtering of each FC processing block can be optimally configured only for one numerology, bandwidth or center frequency at a time. This degradation can be avoided, if needed, by dividing this BWP into two parallel processing streams, one for each numerology, bandwidth, or center frequency, However, this approach considerably increases the required resources, that is, the memory and required fast Fourier transform (FFT) processing units and may induce some latency issues. Now, if the bandwidth or center frequency needs to be adjusted at the symbol boundaries, then there will be evident degradation in the filter performance. These problematic scenarios also include cases, where the ongoing slot-based transmission is preempted by low-latency ultra-reliable low-latency communications (URLLC) transmissions requiring abrupt changes in filter configuration.

The embodiments to be discussed below may be specifically directed to improvements in the filtering element or engine 304, 312 employing a continuous FC-F-OFDM scheme for providing high spectral containment. More specifically, the embodiments focus on providing improved flexibility in multiplexing multiple subbands or bandwidth parts (BWPs) by (dynamically) adjusting the overlap between consecutive FC processing blocks. This approach enables the symbol-synchronous configuration of the parameters for the filtering engine (bandwidth and center frequency) relaxing the memory and latency requirements of the processing when compared with conventional FC processing schemes.

Figure 4:
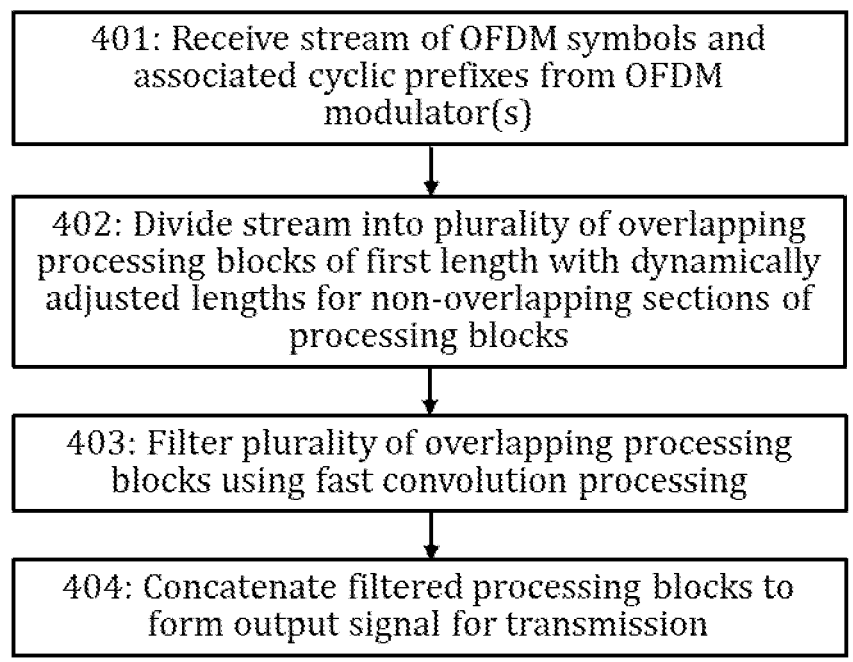
FIGS. 4, 5, 6 and 7 illustrate exemplary processes according to embodiments.

FIG. 4 illustrate a process according to embodiments for performing continuous FC processing in a symbol-synchronous manner. Specifically, FIG. 4 shows a flow chart for a process according to embodiments. The process may be carried out, for example, by a waveform processing device such as a digital filtering element or engine or a digital filter bank. For example, the illustrated process may be carried out by the filtering element 304 of FIG. 3A. The apparatus performing said process may be comprised in a radio transmitter or transceiver. Said radio transmitter or transceiver may, in turn, be comprised, in an access node or a terminal device such as any of the terminal devices 100, 102 of FIG. 1 or the access node 104 of FIG. 1. In the following, the device performing the process is called simply an apparatus.

Referring to FIG. 4, the apparatus initially receives, in block 401, a stream of orthogonal frequency division multiplexing (OFDM) symbols and associated cyclic prefixes (i.e., prefixes of said OFDM symbols) produced by at least one OFDM modulator of a radio transmitter or transceiver.

Said stream may comprise multiple different numerologies. Said multiple different numerologies of said stream may correspond to Long-Term Evolution (LTE) and/or 5G New Radio (5G NR) physical layer (OFDM) numerologies and/or other (OFDM) numerologies where all supported subcarrier spacings align in time at pre-defined intervals such as every half subframe (i.e., every 0.5 ms at least in LTE and 5G NR). A numerology may, in general, be defined as a configuration of waveform parameters. An OFDM numerology may be defined as an OFDM configuration pertaining, e.g., to sub-carrier spacing (SCS), OFDM symbol duration, cyclic prefix length and/or resource block size. Numerologies are sometimes denoted by the symbol μ.

For example, said multiple different numerologies may comprise one or more numerologies defined as:
  numerology 0 (μ=0) with SCS of 15 kHz,
  numerology 1 (μ=1) with SCS of 30 kHz,
  numerology 2 (μ=2) with SCS of 60 kHz,
  numerology 3 (μ=3) with SCS of 120 kHz and
  numerology 4 (μ=4) with SCS of 240 kHz.
Moreover, the properties indicated in the following table may be defined for the numerologies 0-4.

| parameter/ numerology (μ) | 0 | 1 | 2 | 3 | 4 |
| --- | --- | --- | --- | --- | --- |
| SCS (kHz) | 15 | 30 | 60 | 120 | 240 |
| OFDM symbol duration (μs) | 66.67 | 33.33 | 16.67 | 8.33 | 4.17 |
| cyclic prefix duration (μs) | 4.69 | 2.34 | 1.17 | 0.57 | 0.29 |
| OFDM symbol including CP (μs) | 71.35 | 35.68 | 17.84 | 8.92 | 4.46 |

Notably, all of the numerologies 0-4 are synchronized within a half subframe (0.5 ms). The length of the OFDM symbol and the cyclic prefix in samples depends on the used nominal channel bandwidth.

Said stream of OFDM symbol and associated prefixes may be associated specifically with a first subband or bandwidth part (BWP). A bandwidth part may be defined, in general, as a contiguous set of physical resource blocks (PRBs) on a given carrier. A BWP may comprise one or more subbands using the same numerology. The PRBs may be selected from a contiguous subset of the common resource blocks for a given numerology. A BWP defined for a numerology may comprise at least the following three different parameters: subcarrier spacing, symbol duration and cyclic prefix length. Said first subband or BWP may be defined, for example, to be within the 5G NR frequency range 1 (FR1).

The CP length of each initial OFDM symbol in a half subframe in said stream (or at least some of them) may be extended (or enlarged or expanded or increased or augmented) compared to the CP length of any other OFDM symbols having the same numerology within the same half subframe. For example for a nominal channel bandwidth of 10 MHz, the expanded and non-expanded (i.e., default) CP lengths may be 80 samples & 72 samples, 44 samples & 36 samples and 26 samples & 18 samples for numerologies 0, 1 and 2, respectively. In some other embodiments, said extension may occur for some other pre-defined interval (e.g., every frame or every fourth of a frame).

The apparatus divides, in block 402, said stream into a plurality of overlapping processing blocks of a first length. The first length may be equally called FC processing transform size as it corresponds to the size or length of the (inverse) orthogonal transform(s) (e.g., (inverse) fast Fourier transform) performed as part of the FC processing (to be discussed below in connection with block 403 in detail). At least one (optionally, each) of the plurality of overlapping processing blocks comprises a non-overlapping section having values corresponding to a segment of said stream. Specifically, the dividing in block 402 may comprise (dynamically) adjusting a length of the non-overlapping section at least based on whether a cyclic prefix is comprised in said segment of said stream and, if a cyclic prefix is comprised in said segment, on a length of said cyclic prefix. The adjusting may also take into account the numerology of the OFDM symbol associated with said segment of said stream when evaluating the length of said cyclic prefix as the length of the cyclic prefix typically depends also on the numerology used (i.e., different pre-defined lengths of cyclic prefixes are allowed with different numerologies). Moreover, the length of the non-overlapping section may be dependent on an OFDM processing sampling rate $f_s$ (and/or on a nominal channel bandwidth $f_{BW}$ which is tied to the OFDM processing sampling rate $f_s$) for said at least one of the plurality of overlapping processing blocks and/or the first length (i.e., FC processing transform size).

In addition to the non-overlapping section, at least one (optionally, each) of said at least one of the plurality of overlapping processing blocks may further comprise a first overlapping section preceding the non-overlapping section and a second overlapping section following the non-overlapping section. The first overlapping section may have values taken from a preceding segment to said segment of said stream (or possibly zero values, e.g., when no following segment exists) and/or the second overlapping section may have values taken from a following segment to said segment of said stream (or possibly zero values, e.g., when no preceding segment exists). In other embodiments, one or both of the first and second overlapping sections may be defined to always have zero values.

In some embodiments, the adjusting of the length of a non-overlapping section, performed as a part of the dividing process in block 402, is performed as follows. For each processing block comprising a cyclic prefix of an initial symbol of a half subframe (e.g., 0.5 ms) (or, in general, an initial symbol of some pre-defined interval), the apparatus calculates a length of a non-overlapping section of a processing block using a first equation dependent at least on the first length L (given in samples) and an OFDM processing sampling rate $f_s$. For other processing blocks, the apparatus calculates a length of a non-overlapping section of a processing block using a second equation dependent at least on the first length L.

The first and second equations may be defined respectively as $$\overline{L}_s = \alpha + (A+B) \times 2^\beta,$$

$$\overline{L}_s = (A+B) \times 2^\beta,$$

wherein $\overline{L}_s$ and $L_s$ denote a length of an overlapping section of a processing block calculated, respectively, using the first and second equations, α is defined as $\alpha = \text{mod}(0.5 \times 10^{-3} f_s, A+B)$ with $f_s$ being the OFDM processing sampling rate defined by the numerology, β is defined as $\beta = L(2B)$ with L being the first length and A and B are integer parameters having pre-defined values. Notably, it is specifically the parameter α which defines by how many samples should the non-overlapping section of a processing block be expanded. A and B may be defined, e.g., based on allowed values of a cyclic prefix length for a given OFDM symbol length in a given wireless standard or specifically on the smallest OFDM symbol length (defining B) for which the non-expanded cyclic prefix length is still an integer number (defining A).

The parameters A and B may be specifically defined as follows. In LTE and 5G NR, the length of the cyclic prefix scales with the OFDM symbol length. The OFDM symbol length of 128 (=B) is the smallest size for which the non-expanded cyclic prefix length is still an integer number, namely 9 (=A). Non-integer cyclic prefix lengths may, in general, be handled by FC processing, but in practice these are often avoided due to increased system and implementation complexities. Therefore, in some embodiments, A may have a value of 9 and B may have a value of 128 as these values are be specifically suitable for use with LTE and 5G NR networks. By using these definitions for the number of non-overlapping samples in FC processing, all the numerologies may be perfectly synchronized with FC processing.

The OFDM processing sampling rate $f_s$ and the parameter α may have, for example, any of the values listed in the below table for certain nominal channel bandwidths $f_{BW}$ of 5G NR frequency range 1 (FR1).

orthogonal transform is one of a fast Fourier transform, a discrete Fourier transform, a Hartley transform and a number theoretic transform.

In some embodiments, a multi-window FC processing technique may be employed in block 403. Thus, the filtering of a processing block of the plurality of overlapping processing blocks using the fast convolution processing in block 403 may comprise at least applying at least a first time window function, an orthogonal transform, a transform-plane window function, an inverse transform of the orthogonal transform and a second time window function in this order. The orthogonal transform may be defined as described above. Here, the transform-plane window function and the second time window function may specifically have been optimized using simultaneous multi-window optimization of the first time window function, the transform-plane window function and the second time window function.

The apparatus concatenates, in block 404, filtered processing blocks to form an output signal for transmission via at least one antenna of the radio transmitter or transceiver. The overlapping sections of the filtered processing blocks may be removed or added together in forming the output signal. One or more further digital and/or analog processing stages may be arranged between the apparatus and said at least one antenna. The output signal 410 may be at least converted to an analog signal using a digital-to-analog converter before transmission via said at least one antenna. In general, the output signal may be transmitted, in addition to the antenna, via one or more processing stages of the radio transmitter or transceiver. Said processing stages may implement, for example, baseband processing, digital-to-analog conversion, frequency mixing, intermediate frequency processing and/or radio transmission (i.e., processing by a RF front end in transmission).

In some embodiments, overlap-and-save (OLS) and/or overlap-and-add (OLA) processing may be employed in the dividing and/or concatenating in blocks 403, 404. The performing of the overlap-and-save processing may com-

| $f_{BW}$ (MHz) | 5.0 | 10.0 | 15.0 | 20.0 | 25.0 | 30.0 | 40.0 | 50.0 | 60.0 | 70.0 | 80.0 | 90.0 | 100.0 |
|---|---|---|---|---|---|---|---|---|---|---|---|---|---|
| $f_S$ (MHz) | 7.68 | 15.36 | 23.04 | 30.72 | 30.72 | 46.08 | 61.44 | 61.44 | 92.16 | 92.16 | 122.88 | 122.88 | 122.88 |
| α (samples) | 4 | 8 | 12 | 16 | 16 | 24 | 32 | 32 | 48 | 48 | 64 | 64 | 64 |

For example, if the nominal channel bandwidth $f_{BW}$ is 10 MHz, the OFDM processing sampling rate $f_s$ is 15.36 MHz. This means that, assuming a SCS of 15 kHz, the FC processing transform size is 15.36 MHz/15 kHz=1024=B× $2^\beta$ with B=128 and β=3. The normal, non-expanded cyclic prefix is, thus, A×$2^\beta$=72 with A=9. Consequently, all CP-OFDM symbol lengths may be written using the form (A+B)×$2^\beta$. The parameter α corresponds to the number of samples which are "left over" once a half subframe (i.e., 0.5 ms) is filled with an integer number of samples. In this example, the parameter α has the value of 8.

The apparatus filters, in block 403, the plurality of overlapping processing blocks using fast convolution (FC) processing. The filtering using FC processing may be carried out using any known FC processing technique. Similar to as described above, the filtering of a processing block of the plurality of overlapping processing blocks using the fast convolution processing in block 403 may comprise at least applying at least an orthogonal transform, a transform-plane window function, an inverse transform of the orthogonal transform in this order to said processing block. Here, the prise overlapping, in the dividing in block 402, adjacent processing blocks (as described above) and removing, in the concatenating in block 404, overlapping sections of adjacent filtered signals. The performing of the overlap-and-add processing may comprise adding, in the dividing in block 402, samples having a zero value symmetrically to each side of each processing block to form the overlapping sections (or substantially symmetrically if the number of samples dedicated for the two overlapping sections is odd) and adding, in the concatenating in block 404, the overlapping sections of adjacent processing blocks of the filtered processing blocks to each other. In some embodiments, a combination of OLS and OLA methods may be employed (e.g., applying OLS between FC processing blocks having samples from the same CP-OFDM symbol in the non-overlapping section and applying OLA between FC blocks with samples of different CP-OFDM symbols in the non-overlapping section).

In some embodiments, the receiving in block 401, the dividing in block 402, the filtering in block 403 and the concatenating in block 404 may be performed, in parallel, for a plurality of streams of orthogonal frequency division multiplexing symbols and associated cyclic prefixes produced by a plurality of orthogonal frequency-division multiplexing modulators of the radio transmitter or transceiver. Here, the plurality of streams may be associated specifically with different subbands and/or bandwidth parts.

Figure 5:
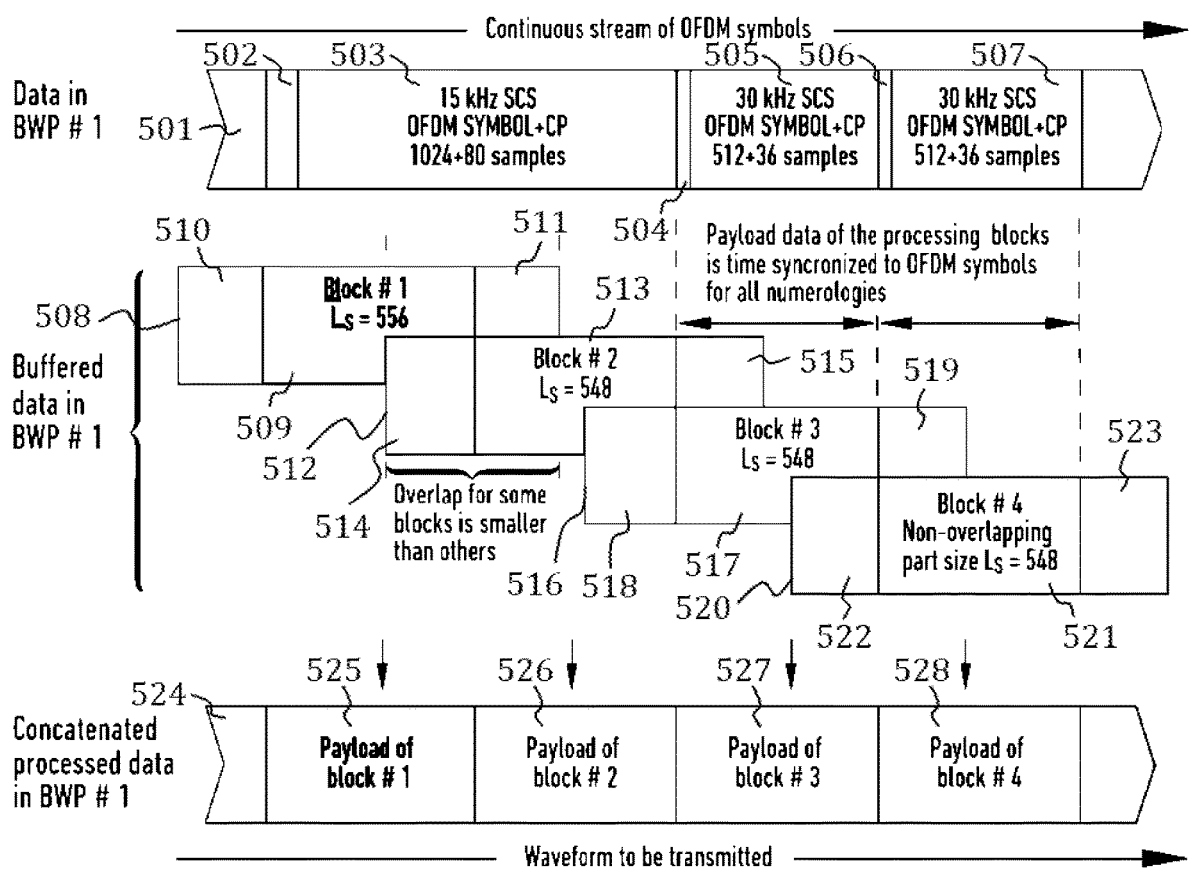

FIG. 5 illustrates an exemplary execution of the process of FIG. 4 for a particular OFDM symbol stream corresponding to a 5G NR 10 MHz channel. In the example of FIG. 5, a continuous stream 501 of OFDM symbols and associated cyclic prefixes comprises three OFDM symbols 503, 505, 507 and three cyclic prefixes 502, 504, 506 for said three OFDM symbols 503, 505, 507. Specifically, the first OFDM symbol 503 and the first cyclic prefix 502 corresponds to numerology 0 ($\mu=0$) with SCS of 15 kHz, OFDM symbol length of 1024 samples and cyclic prefix length of 80 samples and the second and third OFDM symbols 505, 507 and the second and third cyclic prefixes 504, 506 correspond to numerology 1 ($\mu=1$) with SCS of 30 kHz, OFDM symbol length of 512 samples and cyclic prefix length of 36 samples. The continuous stream 501 corresponds to an example of a stream received in block 401 (or a part thereof).

The beginning of the illustrated continuous stream 501 corresponds, here, to a beginning of a half subframe (of length 0.5 ms), i.e., the first OFDM symbol 503 is the first (i.e., initial) OFDM symbol of the half subframe. It is also assumed in this particular example that the beginning of the illustrated continuous stream 501 is a beginning of the data transmission in general. The CP length of the first OFDM symbol 503 is extended, here, compared to the CP length of any other OFDM symbols having the same numerology within the half subframe (not shown in FIG. 5). Specifically, the CP length of the first OFDM symbol 503 is 80 samples while the CP length of any other OFDM symbols having the same numerology within the half subframe is 72 samples. The corresponding CP length values for 30 kHz SCS (i.e., numerology 1) are 44 samples and 36 samples.

In FIG. 5, the continuous stream 501 is divided into four overlapping processing blocks 508, 512, 516, 520 of a first length L. The first length (i.e., the FC processing transform size being equal to FC processing block length) is here specifically 1024 samples. Each of the four overlapping processing blocks 508, 512, 516, 520 comprises a non-overlapping section 509, 513, 517, 521, a first overlapping section 510, 514, 522 and a second overlapping section 511, 515, 523.

The FC processing of a subframe starts by filling the first overlapping section 510 of the first overlapping processing block 508 with $(L-\overline{L}_s)/2=234$ zeros and subsequently filling the non-overlapping section 509 of the first overlapping processing block 508 with $\overline{L}_s=556$ samples from the first OFDM symbol 503 with 15 kHz SCS and its cyclic prefix 502 and the second overlapping section 511 with $(L-\overline{L}_s)/2=234$ (following) samples from the first OFDM symbol 503. Obviously, if the first OFDM symbol is preceded by another ("zeroth") OFDM symbol, the first overlapping section 510 of the first overlapping processing block 508 may be filled with 234 samples taken from said previous OFDM symbol.

The first overlapping section 514 of the second overlapping processing block 512 comprises $(L-L_s)/2=238$ samples from the first OFDM symbol 503, the non-overlapping section 513 of the second overlapping processing block 512 comprises $L_s=548$ samples corresponding to last samples of the first OFDM symbol 503 and the second overlapping section 515 of the second overlapping processing block 512 comprises $(L-L_s)/2=238$ samples from the second OFDM symbol 505 with 30 kHz SCS and its prefix 504.

In an analogous manner, the first overlapping section 518 of the third overlapping processing block 516 comprises $(L-L_s)/2=238$ samples from the first OFDM symbol 503, the non-overlapping section 517 of the third overlapping processing block 516 comprises $L_s=548$ samples corresponding to the samples of the second OFDM symbol 505 and its prefix 504 and the second overlapping section 519 of the third overlapping processing block 516 comprises $(L-L_s)/2=238$ samples from the third OFDM symbol 507 with 30 kHz SCS and its prefix 506.

Finally, the first overlapping section 522 of the fourth overlapping processing block 520 comprises $(L-L_s)/2=238$ samples from the end of the second OFDM symbol 505, the non-overlapping section 521 of the fourth overlapping processing block 520 comprises $L_s=548$ samples corresponding to the samples of the third OFDM symbol 507 and its prefix 506 and the second overlapping section 523 of the fourth overlapping processing block 520 comprises $(L-L_s)/2=238$ samples from either a fourth OFDM symbol and its prefix or $(L-L_s)/2=238$ zeros. It should be noted that the payload data of the overlapping processing blocks 508, 512, 516, 520 is time-synchronized to OFDM symbols for both numerologies used (and in fact for all LTE/5G NR numerologies).

The overlapping processing blocks may, then, be filtered using fast convolution processing (not shown in FIG. 5) as described in connection with block 403 of FIG. 4. After the filtering, the filtered overlapping processing blocks are concatenated to form an output signal 524 for transmission. The output signal comprises four signal blocks 525 to 528 corresponding to the non-overlapping sections of the filtered overlapping processing blocks. As described in connection with FIG. 4, the overlapping sections of the filtered overlapping processing blocks may be discarded or summed together when forming the output signal 524 depending on whether OLS or OLA processing is applied between FC processing blocks, respectively.

After 14 overlapping processing blocks (of which first four are shown in FIG. 5) constituting a full frame have been processed, the process starts from the beginning for a new frame. However, now the beginning of the 15th overlapping processing block is filled with $(L-\overline{L}_{S,15\ kHz})/2=234$ samples from the seventh OFDM symbol and its prefix, instead of zeros. This continuation of the process illustrated in FIG. 8A.

Figure 6:
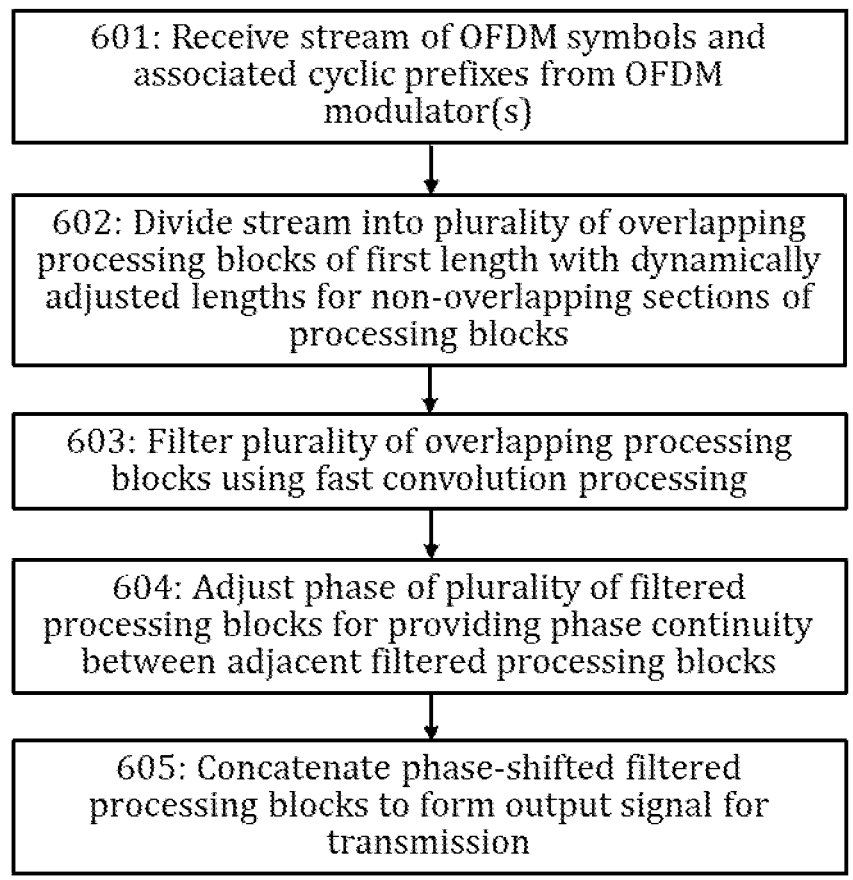

FIG. 6 illustrates another process according to embodiments for performing continuous FC processing in a symbol-synchronous manner. Specifically, FIG. 6 shows a flow chart for a process according to embodiments. The process may be carried out, for example, by a waveform processing device such as a digital filtering element or engine or a digital filter bank. For example, the illustrated process may be carried out by the filtering element 304 of FIG. 3A. The device performing said process may be comprised in a radio transmitter or transceiver. Said radio transmitter or transceiver may, in turn, be comprised in an access node or a terminal device such as any of the terminal devices 100, 102 of FIG. 1 or the access node 104 of FIG. 1. In the following, the device performing the process is called simply an apparatus.

Referring to FIG. 6, the illustrated process corresponds for the most part to the process of FIG. 4. Namely, blocks 601 to 603, 605 of FIG. 6 may correspond fully to blocks 401 to 404 of FIG. 4 and are thus not discussed here for brevity.

The process of FIG. 6 differs from the process of FIG. 4 in that, after the filtering of the plurality of the processing blocks using fast convolution processing in block 603, the apparatus adjusts, in block 604, a phase of a plurality of filtered processing blocks (or at least one of them) for providing phase continuity between adjacent filtered processing blocks. Such phase adjustment may be needed, at least in some embodiments, due to the fact that the overlap between processing blocks may be different from 50% (or other pre-defined constant overlap value defined for a given communications system), in contrast to conventional non-symbol-synchronized continuous FC processing schemes. Specifically, the phase of the plurality of filtered processing blocks may be adjusted according to $$\phi_k = \exp\left(-\frac{2j\pi b_0 L_k}{L}\right),$$

where $\phi_k$ is a phase rotation for the kth filtered overlapping processing block of the plurality of filtered processing blocks given in radians, $b_0$, is a center bin of a subband or a bandwidth part, $L_k$ is a starting index of the kth non-overlapping section in the output signal and L is the first length (in samples). Here, k is a positive integer.

It should be emphasized that the phase adjustment described in connection with block 604 may not be needed with certain parametrizations (e.g., if $b_0$=0). In other embodiments, the phase adjustment may be carried out by a separate apparatus or unit of the radio transmitter or transceiver.

While in the embodiment illustrated in FIG. 6, the phase adjustment (block 604) is carried out following the filtering (block 603), in other embodiments, the phase adjustment of the overlapping processing blocks may be carried out before the filtering. In yet another embodiment, the phase adjustment may be form an (intrinsic) part of the filtering process.

Figure 7:
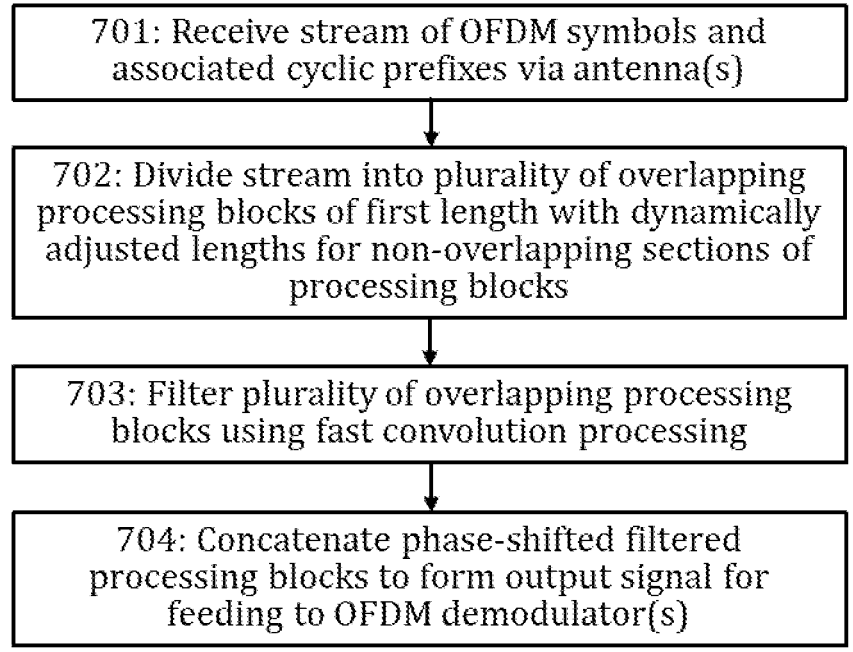

FIG. 7 illustrates a process according to embodiments for performing continuous FC processing in a symbol-synchronous manner. Specifically, FIG. 7 shows a flow chart for a process according to embodiments. The process may be carried out, for example, by a waveform processing device such as a digital filtering element or engine or a digital filter bank. For example, the illustrated process may be carried out by the filtering element 304 of FIG. 3B. The apparatus performing said process may be comprised in a radio receiver or transceiver. In the following, the device performing the process is called simply an apparatus.

The process of FIG. 7 corresponds for the most part to the process of FIG. 4 and is thus discussed only briefly. Any definitions provided in connection with FIG. 4 and/or any of FIGS. 5 and 6 may apply, mutatis mutandis, for the process of FIG. 7, unless otherwise explicitly stated.

Referring to FIG. 7, the apparatus receives, in block 701, a stream of OFDM symbols and associated cyclic prefixes via an antenna of a radio receiver or transceiver. Said stream may be received, in addition to the antenna, one or more processing stages of the radio receiver or transceiver. Said processing stages may implement, for example, radio reception (i.e., processing by a RF front end in reception), frequency mixing, intermediate frequency processing, analog-to-digital conversion and/or baseband processing. The apparatus divides said stream into a plurality of overlapping processing blocks of a first length. At least one of the plurality of overlapping processing blocks comprises a non-overlapping section having values corresponding to a segment of said stream. The dividing comprises (dynamically) adjusting a length of the non-overlapping section at least based on whether a cyclic prefix is comprised in said segment of said stream and, if a cyclic prefix is comprised in said segment, on a length of said cyclic prefix. Then, the apparatus filters, in block 703, the plurality of overlapping processing blocks using fast convolution processing. Finally, the apparatus concatenates, in block 704, a plurality of filtered overlapping processing blocks to form an output signal for feeding to at least one OFDM demodulator of the radio receiver or transceiver. Optionally, the apparatus may adjust, before the concatenating in block 704, a phase of at least one of the plurality of filtered overlapping processing blocks for providing phase continuity between adjacent filtered processing blocks, as described in connection with FIG. 6.

FIGS. 8A, 8B and 8C illustrate three examples of proposed FC processing schemes according to embodiments with FC processing transform sizes of L=1024, L=512, and L=256, respectively. Specifically, FIGS. 8A, 8B and 8C correspond to the nominal bandwidth $f_{BW}$=10 MHz with FC-processing bin spacings of 15 kHz, 30 kHz, and 60 kHz, respectively. The FC-processing bin spacing Δf is related to the OFDM processing sampling rate $f_s$ and the FC processing transforms size L via the equation Δf=$f_s$/L. Each of FIGS. 8A, 8B and 8C illustrate OFDM symbol and prefix streams for numerologies 0, 1 and 2 (corresponding to SCS of 15 kHz, 30 kHz and 60 kHz) and corresponding overlapping processing blocks. While FIGS. 8A, 8B and 8C illustrate different numerologies as different streams, as described in connection with above embodiments and illustrated in FIG. 5, embodiments may be applied also to mixed-numerology streams (i.e., streams combining OFDM symbols and prefixes of different numerologies).

In FIG. 8A, the symbol-synchronized continuous FC processing with L=1024 and 15 kHz FC-processing bin spacing is shown. Here, the non-overlapping part of the overlapping processing blocks is $L_s$=548 samples, except for every 14th processing block where this value is $L_s$=556 samples.

In FIG. 8B, the symbol-synchronized continuous FC processing with L=512 and 30 kHz FC-processing bin spacing is shown. Here, the non-overlapping part of the overlapping processing blocks is $L_s$=274 samples except for every 28th overlapping processing block where this value is $L_s$=282 samples.

In FIG. 8C, the symbol-synchronized continuous FC processing with L=256 and 60 kHz FC-processing bin spacing is shown. Here, the non-overlapping part of the overlapping processing blocks is $L_s$=137 samples except for every 56th overlapping processing block where this value is $L_s$=145 samples.

The embodiments of the continuous symbol-synchronized processing described above provide at least the following advantages:
  The processing may be optimized to long-term evolution (LTE) and 5G NR physical-layer numerology, where all supported subcarrier spacings align in time in every 0.5 ms time resolution.
  FC processing blocks are aligned with OFDM symbols of all different subcarrier spacings in mixed-numerology implementation of 5G NR.
  FC processing blocks are also aligned between LTE and all numerologies with 5G NR, allowing smooth carrier combining processing in Tx and corresponding carrier separating Rx processing in a base station. In addition, due to the alignment between LTE and 5G NR, the embodiments provide improved support for (enhanced) dynamic spectrum access mechanism, which enables time-multiplexing of LTE and 5G NR within the same frequency band.

Only one FC processing block within the 0.5 ms time window has different overlap, all other FC processing blocks have common overlap.

Processing can be performed using either overlap-and-save or overlap-and-add, or even a combination of these, providing additional degree of flexibility for implementation.

By using FC processing bin spacing of 60 kHz (achieved, e.g., with OFDM processing sampling rate $f_s$=15.36 MHz (i.e., 256×60 kHz) corresponding to a channel bandwidth of 10 MHz and the FC processing transform size L=256), the support for dynamic changes in the filter parametrization is enabled with time resolution corresponding to the 60 kHz subcarrier spacing.

Moreover, at least some of the embodiments may be optimized for LTE and 5G NR physical layer, enable efficient implementation allowing to minimize latency and buffering requirements and/or allow simple and deterministic control for FC processing blocks. It should, however, be emphasized that while some embodiments are optimized specifically for LTE and 5G NR, embodiments may be used also for filtering other signals, e.g., 2G (GSM) and/or 3G (UMTS) signals.

Figure 9:
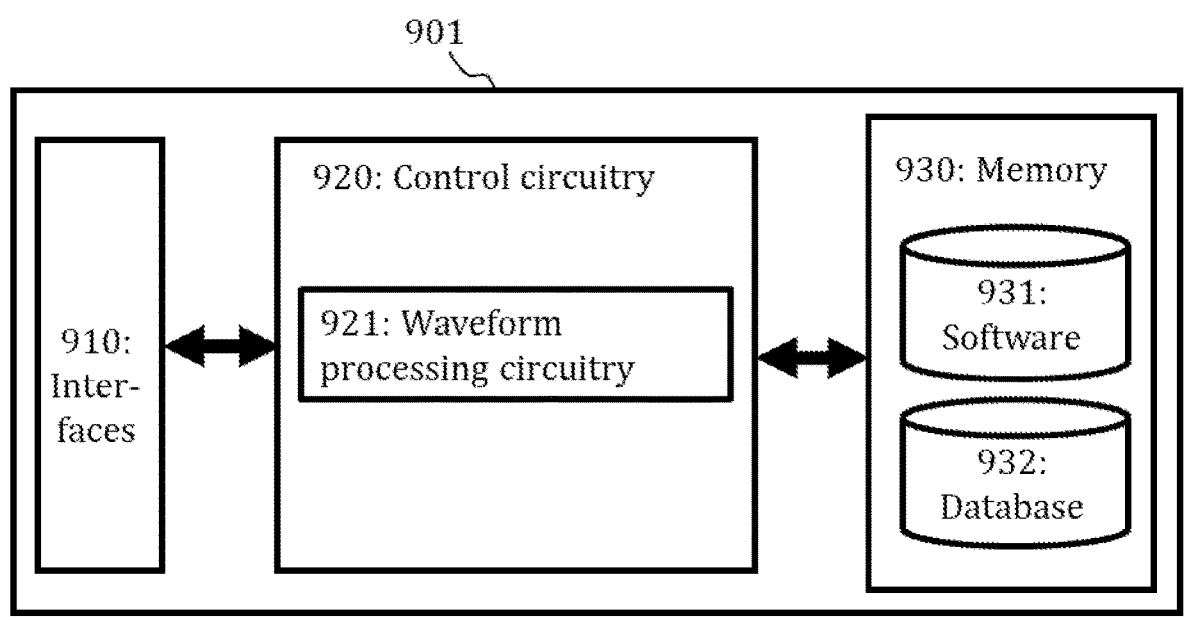
FIG. 9 illustrates an exemplary apparatus according to embodiments.

FIG. 9 illustrates an exemplary apparatus 901 configured to carry out at least the functions described above in connection with at least some of the processes illustrated in any of FIGS. 4 to 7, 8A, 8B and 8C. In some embodiments, the apparatus 901 may, instead, be configured to carry out the functions described above in connection with the filtering element 304 of FIG. 3A or a filtering element 312 of FIG. 3B. The apparatus may be an electronic device comprising electronic circuitries. The apparatus may be a separate entity or a plurality of separate entities. The apparatus may comprise a control circuitry 910 such as at least one processor, and at least one memory 930 including a computer program code (software) 931 wherein the at least one memory and the computer program code (software) are configured, with the at least one processor, to cause the apparatus to carry out any one of the embodiments of the waveform processing device described above.

The memory 930 may be implemented using any suitable data storage technology, such as semiconductor based memory devices, flash memory, magnetic memory devices and systems, optical memory devices and systems, fixed memory and removable memory. The memory may comprise a database 932 which may be or comprise the database as described in relation to previous embodiments. The memory 930 may be connected to the control circuitry 920 via an interface.

The apparatus may further comprise interfaces 910 comprising hardware and/or software for realizing connectivity according to one or more communication protocols. The interfaces 910 may comprise, for example, interfaces enabling the connections between the apparatus 901 and other apparatuses as described, e.g., in relation to FIGS. 1, 2, 3A and 3B. In some embodiments, the interfaces 910 may provide the apparatus with communication capabilities to communicate in the cellular communication system and enable communication with network nodes and terminal devices, for example. The interfaces 910 may comprise standard well-known components such as an amplifier, filter, frequency-converter, (de)modulator, and encoder/decoder circuitries and one or more antennas.

Referring to FIG. 9, the control circuitry 920 may comprise waveform processing circuitry 921 configured to perform the waveform processing according to any of embodiments illustrated in FIGS. 4 to 6.

As used in this application, the term "circuitry" may refer to one or more or all of the following:
(a) hardware-only circuit implementations (such as implementations in only analog and/or digital circuitry) and
(b) combinations of hardware circuits and software, such as (as applicable):
(i) a combination of analog and/or digital hardware circuit(s) with software/firmware and
(ii) any portions of hardware processor(s) with software (including digital signal processor(s)), software, and memory(ies) that work together to cause an apparatus, such as a mobile phone or server, to perform various functions) and
(c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device In an embodiment, at least some of the processes described in connection with FIGS. 4 to 7, 8A, 8B and 8C may be carried out by an apparatus comprising corresponding means for carrying out at least some of the described processes. Some example means for carrying out the processes may include at least one of the following: detector, processor (including dual-core and multiple-core processors), digital signal processor, controller, receiver, transmitter, encoder, decoder, memory, RAM, ROM, software, firmware, display, user interface, display circuitry, user interface circuitry, user interface software, display software, circuit, antenna, antenna circuitry, and circuitry. In an embodiment, the at least one processor, the memory, and the computer program code form processing means or comprises one or more computer program code portions for carrying out one or more operations according to any one of the embodiments of FIG. 4 to 7, 8A, 8B and 8C or operations thereof.

According to an embodiment, there is provided an apparatus (e.g., a waveform processing device for a radio transmitter or transceiver) comprising:

means for receiving a stream of orthogonal frequency division multiplexing symbols and associated cyclic prefixes produced by at least one orthogonal frequency-division multiplexing modulator of a radio transmitter or transceiver;

means for dividing said stream into a plurality of overlapping processing blocks of a first length, wherein at least one of the plurality of overlapping processing blocks comprises a non-overlapping section having values corresponding to a segment of said stream, the dividing comprising adjusting a length of the non-overlapping section at least based on whether a cyclic prefix is comprised in said segment of said stream and, if a cyclic prefix is comprised in said segment, on a length of said cyclic prefix;

means for filtering the plurality of overlapping processing blocks using fast convolution processing; and means for concatenating a plurality of filtered processing blocks to form an output signal for transmission via at least one antenna of the radio transmitter or transceiver.

According to an embodiment, there is provided an apparatus (e.g., a waveform processing device for a radio receiver or transceiver) comprising:

means for receiving a stream of orthogonal frequency division multiplexing symbols and associated cyclic prefixes via an antenna of a radio receiver or transceiver;

means for dividing said stream into a plurality of overlapping processing blocks of a first length, wherein at least one of the plurality of overlapping processing blocks comprises a non-overlapping section having values corresponding to a segment of said stream, the dividing comprising adjusting a length of the non-overlapping section at least based on whether a cyclic prefix is comprised in said segment of said stream and, if a cyclic prefix is comprised in said segment, on a length of said cyclic prefix;

means for filtering the plurality of overlapping processing blocks using fast convolution processing; and means for concatenating a plurality of filtered overlapping processing blocks to form an output signal for feeding to at least one orthogonal frequency-division multiplexing demodulator of the radio receiver or transceiver.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. For firmware or software, the implementation can be carried out through modules of at least one chipset (procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

Embodiments as described may also be carried out in the form of a computer process defined by a computer program or portions thereof. Embodiments of the methods described in connection with FIGS. 4 to 7, 8A, 8B and 8C may be carried out by executing at least one portion of a computer program comprising corresponding instructions. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a non-transitory medium. Coding of software for carrying out the embodiments as shown and described is well within the scope of a person of ordinary skill in the art.

According to an embodiment, there is provided a computer program comprising instructions for causing an apparatus to perform the embodiments of the methods described in connection with any of FIGS. 4 to 7.

According to an embodiment, there is provided a computer readable medium comprising program instructions for causing an apparatus to perform the embodiments of the methods described in connection with any of FIGS. 4 to 7.

According to an embodiment, there is provided a non-transitory computer readable medium comprising program instructions for causing an apparatus to perform the embodiments of the methods described in connection with any of FIGS. 4 to 7, 8A, 8B and 8C.

Even though the invention has been described above with reference to an example according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. An apparatus comprising:
   at least one processor; and
   at least one memory including computer program code, the at least one memory and computer program code configured to, with the at least one processor, cause the apparatus to perform:
   receiving a stream of orthogonal frequency division multiplexing symbols and associated cyclic prefixes produced by at least one orthogonal frequency-division multiplexing modulator of a radio transmitter or transceiver, wherein the stream comprises a plurality of different numerologies;
   dividing said stream into a plurality of overlapping processing blocks of a first length, wherein at least one of the plurality of overlapping processing blocks comprises a non-overlapping section having values corresponding to a segment of said stream, the dividing comprising adjusting a length of the non-overlapping section at least based on whether a cyclic prefix is comprised in said segment of said stream and, if a cyclic prefix is comprised in said segment, on a length of said cyclic prefix so as to enable symbol-synchronous continuous fast convolution processing, wherein the adjusting of the length of the non-overlapping section of said at least one of the plurality of overlapping processing blocks comprises:
   if a non-overlapping section of an overlapping processing block comprises a cyclic prefix having an expanded length compared to a default length of a cyclic prefix defined for a numerology of an orthogonal frequency division multiplexing symbol of said non-overlapping section, calculating a length of a non-overlapping section of the overlapping processing block using a first equation dependent at least on the first length and an orthogonal frequency division multiplexing processing sampling rate of the overlapping processing block defined by the numerology and otherwise, calculating the length of the non-overlapping section of the overlapping processing block using a second equation dependent at least on the first length, wherein the second equation is different from the first equation;

filtering the plurality of overlapping processing blocks using fast convolution processing; and concatenating a plurality of filtered processing blocks to form an output signal for transmission via at least one antenna of the radio transmitter or transceiver.

2. The apparatus according to claim 1, wherein said at least one of the plurality of overlapping processing blocks further comprises a first overlapping section preceding the non-overlapping section having values taken from a preceding segment to said segment of said stream or zero values and a second overlapping section following the non-overlapping section having values taken from a following segment to said segment of said stream or zero values.

3. The apparatus of claim 1, wherein the at least one memory and the computer program code are configured, with the at least one processor, to cause the apparatus to perform, before the concatenating and before or after or as a part of the filtering:

adjusting a phase of at least one of the plurality of overlapping processing blocks for providing phase continuity between adjacent filtered processing blocks.

4. The apparatus of claim 3, wherein the phase of the at least one of the plurality of overlapping processing blocks is adjusted according to $$\phi_k = \exp\left(-\frac{2j\pi b_0 L_k}{L}\right),$$

wherein $\phi_k$ is a phase rotation for the kth filtered overlapping processing block, $b_0$ is a center bin of a subband or a bandwidth part, $L_k$ is a starting index of the kth non-overlapping section to be included in the output signal and L is the first length, k being a positive integer.

5. The apparatus of claim 1, wherein said stream comprises multiple different numerologies corresponding to Long-Term Evolution and/or 5G New Radio physical layer numerologies and/or other numerologies where all supported subcarrier spacings align in time every half subframe.

6. The apparatus of claim 1, wherein at least one initial orthogonal frequency division multiplexing symbol of at least one half subframe in said stream is preceded by a cyclic prefix having an expanded length compared to a default length of a cyclic prefix defined for a numerology of said initial orthogonal frequency division multiplexing symbol.

7. The apparatus of claim 1, wherein the first and second equations are defined respectively as $$\overline{L}_s = \alpha + (A+B) \times 2^\beta,$$

$$\overline{L}_s = (A+B) \times 2^\beta,$$

wherein $\overline{L}_s$ and $L_s$ denote the length of the non-overlapping section of the overlapping processing block calculated, respectively, using the first and second equations, $\alpha$ is defined as $\alpha = \mathrm{mod}(0.5 \times 10^{-3}\ s^* f_s, A+B)$ with $f_s$ being the orthogonal frequency division multiplexing processing sampling rate in hertz, $\beta$ is defined as $\beta = L/(2B)$ with L being the first length and A and B are unitless integer parameters having pre-defined values.

8. The apparatus of claim 1, wherein the dividing and/or the concatenating are performed according to an overlap-and-save method, an overlap-and-add method or a combination of the overlap-and-save method and the overlap-and-add method.

9. The apparatus of claim 1, wherein the filtering of the plurality of overlapping processing blocks using the fast convolution processing comprises:

applying at least an orthogonal transform, a transform-plane window function, an inverse transform of the orthogonal transform in this order, wherein the orthogonal transform is one of a fast Fourier transform, a discrete Fourier transform, a Hartley transform and a number theoretic transform; or applying at least a first time window function, an orthogonal transform, a transform-plane window function, an inverse transform of the orthogonal transform and a second time window function in this order, wherein the orthogonal transform is one of a fast Fourier transform, a discrete Fourier transform, a Hartley transform and a number theoretic transform and the first time window function, the transform-plane window function and the second time window function have been optimized using simultaneous multi-window optimization of the first time window function, the transform-plane window function and the second time window function.

10. An apparatus comprising:

at least one processor; and at least one memory including computer program code, the at least one memory and computer program code configured to, with the at least one processor, cause the apparatus to perform:

receiving a stream of orthogonal frequency division multiplexing symbols and associated cyclic prefixes via an antenna of a radio receiver or transceiver, wherein the stream comprises a plurality of different numerologies;

dividing said stream into a plurality of overlapping processing blocks of a first length, wherein at least one of the plurality of overlapping processing blocks comprises a non-overlapping section having values corresponding to a segment of said stream, the dividing comprising adjusting a length of the non-overlapping section at least based on whether a cyclic prefix is comprised in said segment of said stream and, if a cyclic prefix is comprised in said segment, on a length of said cyclic prefix so as to enable symbol-synchronous continuous fast convolution processing, wherein the adjusting of the length of the non-overlapping section of said at least one of the plurality of overlapping processing blocks comprises:

if a non-overlapping section of an overlapping processing block comprises a cyclic prefix having an expanded length compared to a default length of a cyclic prefix defined for a numerology of an orthogonal frequency division multiplexing symbol of said non-overlapping section, calculating a length of a non-overlapping section of the overlapping processing block using a first equation dependent at least on the first length and an orthogonal frequency division multiplexing processing sampling rate of the overlapping processing block defined by the numerology and otherwise, calculating the length of the non-overlapping section of the overlapping processing block using a second equation dependent at least on the first length, wherein the second equation is different from the first equation;

filtering the plurality of overlapping processing blocks using fast convolution processing; and concatenating a plurality of filtered overlapping processing blocks to form an output signal for feeding to at least one orthogonal frequency-division multiplexing demodulator of the radio receiver or transceiver.

11. The apparatus according to claim 10, wherein said at least one of the plurality of overlapping processing blocks further comprises a first overlapping section preceding the non-overlapping section having values taken from a preceding segment to said segment of said stream or zero values and a second overlapping section following the non-overlapping section having values taken from a following segment to said segment of said stream or zero values.

12. The apparatus of claim 10, wherein the at least one memory and the computer program code are configured, with the at least one processor, to cause the apparatus to perform, before the concatenating and before or after or as a part of the filtering:

adjusting a phase of at least one of the plurality of overlapping processing blocks for providing phase continuity between adjacent filtered processing blocks.

13. The apparatus of claim 10, wherein said stream comprises multiple different numerologies corresponding to Long-Term Evolution and/or 5G New Radio physical layer numerologies and/or other numerologies where all supported subcarrier spacings align in time every half subframe.

14. The apparatus of claim 10, wherein at least one initial orthogonal frequency division multiplexing symbol of at least one half subframe in said stream is preceded by a cyclic prefix having an expanded length compared to a default length of a cyclic prefix defined for a numerology of said initial orthogonal frequency division multiplexing symbol.

15. The apparatus of claim 10, wherein the first and second equations are defined respectively as $$\overline{L}_s = \alpha + (A+B) \times 2^\beta,$$

$$L_s = (A+B) \times 2^\beta,$$

wherein $\overline{L}_s$ and $L_s$ denote the length of the non-overlapping section of the overlapping processing block calculated, respectively, using the first and second equations, $\alpha$ is defined as $\alpha = \mathrm{mod}(0.5 \times 10^{-3}\, s^* f_s, A+B)$ with $f_s$ being the orthogonal frequency division multiplexing processing sampling rate in hertz, $\beta$ is defined as $\beta = /(2B)$ with L being the first length and A and B are unitless integer parameters having pre-defined values.

16. The apparatus of claim 10, wherein the filtering of the plurality of overlapping processing blocks using the fast convolution processing comprises:

applying at least an orthogonal transform, a transform-plane window function, an inverse transform of the orthogonal transform in this order, wherein the orthogonal transform is one of a fast Fourier transform, a discrete Fourier transform, a Hartley transform and a number theoretic transform; or applying at least a first time window function, an orthogonal transform, a transform-plane window function, an inverse transform of the orthogonal transform and a second time window function in this order, wherein the orthogonal transform is one of a fast Fourier transform, a discrete Fourier transform, a Hartley transform and a number theoretic transform and the first time window function, the transform-plane window function and the second time window function have been optimized using simultaneous multi-window optimization of the first time window function, the transform-plane window function and the second time window function.

17. A method comprising:

receiving a stream of orthogonal frequency division multiplexing symbols and associated cyclic prefixes produced by at least one orthogonal frequency-division multiplexing modulator of a radio transmitter or transceiver, wherein the stream comprises a plurality of different numerologies;

dividing said stream into a plurality of overlapping processing blocks of a first length, wherein at least one of the plurality of overlapping processing blocks comprises a non-overlapping section having values corresponding to a segment of said stream, the dividing comprising adjusting a length of the non-overlapping section at least based on whether a cyclic prefix is comprised in said segment of said stream and, if a cyclic prefix is comprised in said segment, a length of said cyclic prefix so as to enable symbol-synchronous continuous fast convolution processing, wherein the adjusting of the length of the non-overlapping section of said at least one of the plurality of overlapping processing blocks comprises:

if a non-overlapping section of an overlapping processing block comprises a cyclic prefix having an expanded length compared to a default length of a cyclic prefix defined for a numerology of an orthogonal frequency division multiplexing symbol of said non-overlapping section, calculating a length of a non-overlapping section of the overlapping processing block using a first equation dependent at least on the first length and an orthogonal frequency division multiplexing processing sampling rate of the overlapping processing block defined by the numerology and otherwise, calculating the length of the non-overlapping section of the overlapping processing block using a second equation dependent at least on the first length, wherein the second equation is different from the first equation;

filtering the plurality of overlapping processing blocks using fast convolution processing; and concatenating filtered processing blocks to form an output signal for transmission via at least one antenna of the radio transmitter or transceiver.

18. A non-transitory computer readable medium comprising program instructions that when executed by an apparatus, cause the apparatus to perform at least the following:

receiving a stream of orthogonal frequency division multiplexing symbols and associated cyclic prefixes produced by at least one orthogonal frequency-division multiplexing modulator of a radio transmitter or transceiver, wherein the stream comprises a plurality of different numerologies;

dividing said stream into a plurality of overlapping processing blocks of a first length, wherein at least one of the plurality of overlapping processing blocks comprises a non-overlapping section having values corresponding to a segment of said stream, the dividing comprising adjusting a length of the non-overlapping section at least based on whether a cyclic prefix is comprised in said segment of said stream and, if a cyclic prefix is comprised in said segment, a length of said cyclic prefix so as to enable symbol-synchronous continuous fast convolution processing, wherein the adjusting of the length of the non-overlapping section of said at least one of the plurality of overlapping processing blocks comprises:

if a non-overlapping section of an overlapping processing block comprises a cyclic prefix having an expanded length compared to a default length of a cyclic prefix defined for a numerology of an orthogonal frequency division multiplexing symbol of said non-overlapping section, calculating a length of a non-overlapping section of the overlapping processing block using a first equation dependent at least on the first length and an orthogonal frequency division multiplexing processing sampling rate of the overlapping processing block defined by the numerology and otherwise, calculating the length of the non-overlapping section of the overlapping processing block using a second equation dependent at least on the first length, wherein the second equation is different from the first equation;

filtering the plurality of overlapping processing blocks using fast convolution processing; and concatenating filtered processing blocks to form an output signal for transmission via at least one antenna of the radio transmitter or transceiver.

\* \* \* \* \*